Sept. 29, 1925.
G. MAUNZ
FRAME FOR SUPPORTING ARTIFICIAL PLANTS
Filed March 11, 1924
1,555,475
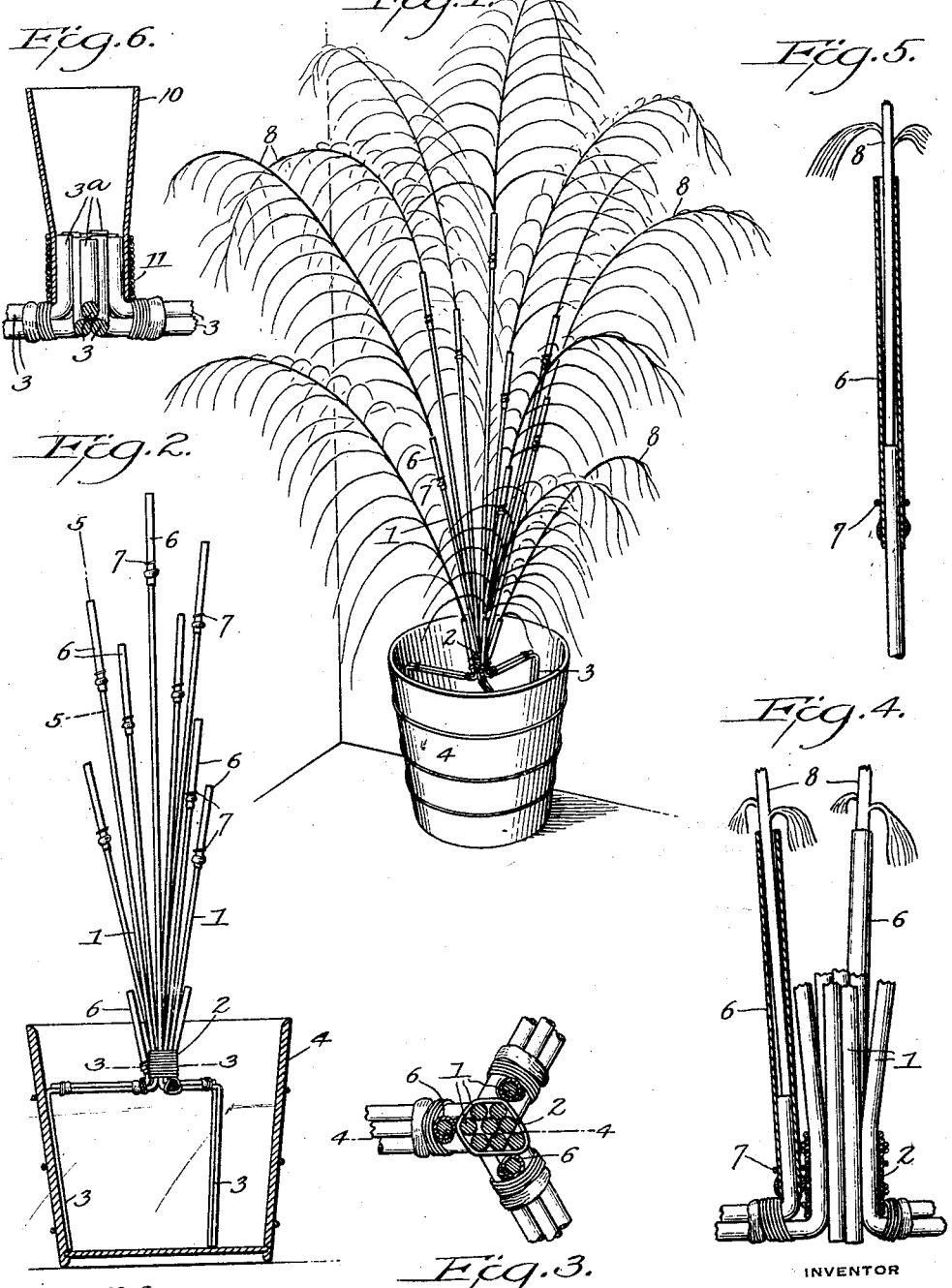

Patented Sept. 29, 1925.

1,555,475

UNITED STATES PATENT OFFICE.

GEORGE MAUNZ, OF BROOKLYN, NEW YORK.

FRAME FOR SUPPORTING ARTIFICIAL PLANTS.

Application filed March 11, 1924. Serial No. 698,429.

*To all whom it may concern:*

Be it known that I, GEORGE MAUNZ, a citizen of the United States, and a resident of the borough of Brooklyn, city of New York, county of Kings, and State of New York, have invented certain new and useful Improvements in Frames for Supporting Artificial Plants, of which the following is a specification.

The object of the present invention is to provide means for grouping artificial palm leaves or the like into a plant-like structure, that will combine extreme lightness and cheapness with a fairly natural appearance.

To this end, the invention consists in arranging a plurality of tubular stalk holders in a group, assembling the lower parts of the stalks of a plant and mounting such a group of stalk holders upon suitable feet, whereby the same may be inserted into a flower pot.

The invention will be described with reference to the accompanying drawings, in which Figure 1 is a perspective view of the artificial plant.

Figure 2 is a side view in partial section of the frame and the containing flower pot.

Figure 3 is a horizontal cross-section on line 3—3 of Figure 2.

Figure 4 is a vertical section on line 4—4 of Figure 3.

Figure 5 is a detail in section of one of the tubular stalk holders on line 5—5 of Figure 2.

Figure 6 is a detail sectional view of a modification.

As artificial plants require frequent moving, being often carried into and out of buildings for decorative purposes, it is essential that they be made as light as possible and also that a proper amount of durability be provided.

In my invention, I arrange a group of wires 1, bound together into a central bunch at the base, as shown at 2, and diverging outwardly as they extend upwardly from the base, an exact imitation of the way in which a natural palm grows. Below the neck 2, the wires are bent out and then down to form say three legs 3, which are adapted to fit snugly inside of a receptacle such as flower pot or jardinière 4. The upper end of each wire stem has a tubular end 6 fitted over and secured to it in any suitable manner as for instance by small wire rings 7. These tubular extensions are made of thin metal and the stalk of, for example, artificial palm leaves 8 so nearly fills the tube as to form apparently one continuous stalk. The end of the wire in the tube forms also a natural rest for the lower end of the leaf stalk so that the stalks may be held in accurate position to make the proper grouping to give the semblance of an artificial plant. Such a combination presents a neat, efficient and light means of assembling an artificial plant that can be handled either as a whole, or that can be easily taken apart and handled piecemeal.

In Figure 6 I have shown a slight modification of my invention, in which the wires 3 forming the skeleton base or stand are bound together as in the preferred form above described, but are cut off short just above their upturned portions and have their short upturned ends 3ª confined in the lower end of a slightly conical sheet metal cup 10, which is secured to the wires in any suitable manner as by a winding of small wire 11 and solder. This cup 10 is designed to have the upstanding wires carrying tubes 6 of Figure 5 supported in it. These upright wires carrying tubes will be of varying lengths and will be supported in the cup 10 in the same spread-out or diverging group as shown in Figure 1. This modified form of the device has the advantage of a more compact arrangement of the parts in knockdown condition.

I claim:—

1. An artificial plant comprising a diverging group of wires of different lengths, and tubular stem holders mounted on the ends of said wires, the wire ends extending into the stem holders and forming bottom rests for stems.

2. An artificial plant comprising a diverging group of wires, tubular stem holders mounted on and aligned with said wires, and plant stalks removably mounted in said tubular holders in alignment with said wires.

3. An artificial plant comprising a plurality of wires secured together in a bunch, said wires spreading or diverging from the bunch above and provided with diverging supporting leg extensions below, tubular stem holders mounted upon and aligned with the upper ends of said wires, and plant stalks removably mounted in said tubular holders in alignment with said tubular holders.

GEORGE MAUNZ.